United States Patent
Josefczyk

(10) Patent No.: US 8,984,940 B2
(45) Date of Patent: Mar. 24, 2015

(54) PASSIVE DYNAMIC INERTIAL ROTOR BALANCE SYSTEM FOR TURBOMACHINERY

(75) Inventor: Ronald John Josefczyk, Sarver, PA (US)

(73) Assignee: Elliot Company, Jeannette, PA (US)

( * ) Notice: Subject to any disclaimer, the term of this patent is extended or adjusted under 35 U.S.C. 154(b) by 231 days.

(21) Appl. No.: 13/438,922

(22) Filed: Apr. 4, 2012

(65) Prior Publication Data

US 2013/0263659 A1    Oct. 10, 2013

(51) Int. Cl.
*G01M 1/16* (2006.01)
*F16F 15/36* (2006.01)

(52) U.S. Cl.
CPC .................................. *F16F 15/363* (2013.01)
USPC ............................................. 73/470; 73/458

(58) Field of Classification Search
CPC ........... G01M 1/02; G01M 1/16; G01M 1/32; F16F 15/28
USPC .................... 73/457, 458, 460, 462, 468, 470
See application file for complete search history.

(56) References Cited

U.S. PATENT DOCUMENTS

| | | | |
|---|---|---|---|
| 1,776,125 A | 9/1930 | Linn | |
| 2,576,105 A | 11/1951 | Childs | |
| 2,659,243 A | 11/1953 | Darrieus | |
| 2,771,240 A | 11/1956 | Gurin | |
| 3,282,127 A * | 11/1966 | Deakin | ........................ 74/571.1 |
| 3,410,154 A * | 11/1968 | Deakin | ........................ 74/571.1 |
| 3,692,236 A * | 9/1972 | Livshitz et al. | ................. 494/20 |
| 3,696,688 A * | 10/1972 | Goodrich et al. | ............ 74/570.2 |
| 4,060,009 A * | 11/1977 | Wyman | ......................... 368/171 |
| 4,075,909 A * | 2/1978 | Deakin | ......................... 74/570.1 |
| 4,294,135 A | 10/1981 | Tameo | |
| 4,674,356 A * | 6/1987 | Kilgore | ......................... 74/570.2 |
| 4,803,893 A | 2/1989 | Bachinski | |
| 4,832,566 A | 5/1989 | Martin | |
| 4,927,326 A | 5/1990 | von Pragenau | |
| 4,967,550 A | 11/1990 | Acton et al. | |
| 5,110,257 A | 5/1992 | Hibner et al. | |
| 5,207,634 A * | 5/1993 | Greenstein | ...................... 494/10 |
| 5,214,585 A * | 5/1993 | Ehrich | ............................ 73/462 |
| 5,376,063 A * | 12/1994 | Greenstein | ...................... 494/37 |
| 5,471,896 A * | 12/1995 | Schierling et al. | ........... 464/68.2 |
| 5,575,182 A * | 11/1996 | Schierling et al. | ........... 464/68.1 |

(Continued)

FOREIGN PATENT DOCUMENTS

| | | | |
|---|---|---|---|
| JP | 1227802 A | 9/1989 |
| KR | 100759597 B1 | 9/2007 |
| KR | 100974525 B1 | 8/2010 |

*Primary Examiner* — Laura Martin
*Assistant Examiner* — Samir M Shah
(74) *Attorney, Agent, or Firm* — The Webb Law Firm

(57) ABSTRACT

A passive dynamic inertial rotor balance system including a plurality of balancing members fitted onto a rotor shaft at locations of predicted maximum shaft modal deflection. Each of the balancing members has at least one chamber and located within the at least one chamber is a plurality of movable weights and a viscous fluid. As the shaft accelerates toward an unbalance point, the weights move within the at least one chamber to a location which is opposite from the unbalance point. The viscous fluid provides damping for the movable weights to prevent excess movement within the chamber and to provide lubrication thereof. A system for self-correcting an unbalance of a turbomachinery rotor during rotation of the rotor and a method for balancing a rotor in a turbomachinery is also provided.

14 Claims, 3 Drawing Sheets

(56) References Cited

U.S. PATENT DOCUMENTS

| | | | |
|---|---|---|---|
| 5,575,183 A * | 11/1996 | Schierling et al. | 464/68.2 |
| 5,593,281 A | 1/1997 | Tai | |
| 5,715,731 A | 2/1998 | Koch | |
| 5,820,348 A | 10/1998 | Fricke | |
| 5,850,749 A * | 12/1998 | Kim | 68/23.2 |
| 5,941,133 A * | 8/1999 | Wierzba et al. | 74/570.2 |
| 6,004,095 A | 12/1999 | Waitz et al. | |
| 6,119,547 A * | 9/2000 | Goransson et al. | 74/572.4 |
| 6,132,354 A * | 10/2000 | Ohtsu et al. | 494/16 |
| 6,210,099 B1 | 4/2001 | Hugbart et al. | |
| 6,299,410 B1 | 10/2001 | Hilbert et al. | |
| 6,481,969 B2 | 11/2002 | Berry et al. | |
| 6,588,298 B2 | 7/2003 | Czerniak et al. | |
| 6,651,527 B2 * | 11/2003 | Hehn | 74/570.2 |
| 6,893,222 B2 | 5/2005 | Allam | |
| 6,949,063 B2 * | 9/2005 | Baik et al. | 494/1 |
| 6,950,763 B1 * | 9/2005 | Bechhoefer | 702/56 |
| 6,960,158 B2 * | 11/2005 | Mackel | 494/82 |
| 6,976,827 B2 | 12/2005 | Bruno et al. | |
| 7,025,714 B2 * | 4/2006 | Escal | 494/1 |
| 7,066,025 B1 * | 6/2006 | Corbin | 73/462 |
| 7,347,672 B2 | 3/2008 | Bertrand et al. | |
| 7,435,211 B2 * | 10/2008 | Kim et al. | 494/82 |
| 7,491,031 B2 | 2/2009 | Brault et al. | |
| 7,912,587 B2 * | 3/2011 | Walters et al. | 700/279 |
| 7,942,801 B2 * | 5/2011 | Ryu et al. | 494/82 |
| 8,051,710 B2 * | 11/2011 | Van Dam et al. | 73/468 |
| 8,251,883 B2 * | 8/2012 | Ryu et al. | 494/37 |
| 8,292,793 B2 * | 10/2012 | Ryu et al. | 494/37 |
| 8,303,255 B2 * | 11/2012 | Ramlogan et al. | 416/144 |
| 8,375,826 B1 * | 2/2013 | Farley et al. | 74/570.2 |
| 8,695,382 B2 * | 4/2014 | Kim et al. | 68/23.1 |
| 2002/0028141 A1 | 3/2002 | Berry et al. | |
| 2003/0213334 A1 | 11/2003 | Czerniak et al. | |
| 2008/0095613 A1 | 4/2008 | Blanchard et al. | |
| 2009/0304509 A1 | 12/2009 | Blanchard et al. | |
| 2010/0009835 A1 * | 1/2010 | Ryu et al. | 494/82 |
| 2010/0021303 A1 | 1/2010 | Nielsen et al. | |
| 2010/0074752 A1 | 3/2010 | Denis et al. | |

* cited by examiner

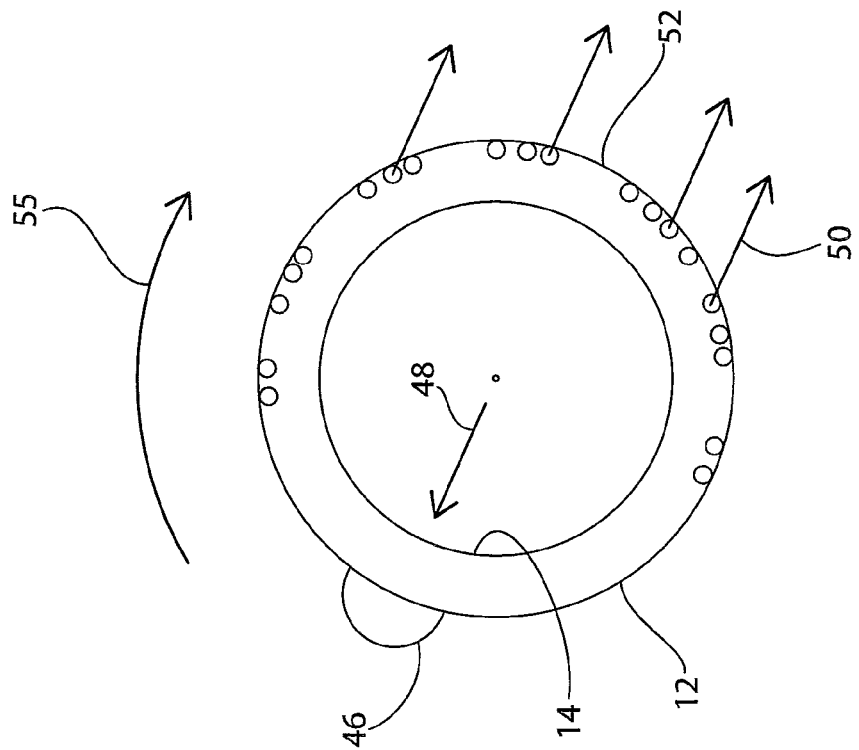
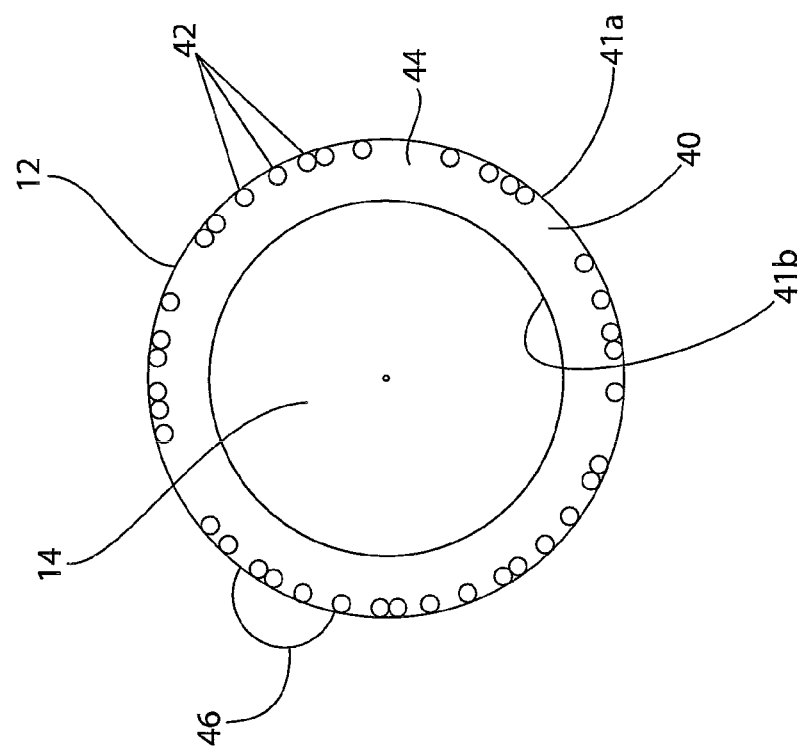
FIG. 3B
FIG. 3A

PASSIVE DYNAMIC INERTIAL ROTOR BALANCE SYSTEM FOR TURBOMACHINERY

BACKGROUND OF THE INVENTION

1. Field of the Invention

This invention relates generally to a balancing system for a rotor, such as a rotor for use in turbomachinery. More particularly, the present invention relates to a dynamic balance system for a rotor which passively self corrects for unbalance while the rotor is in operation thereby reducing or eliminating the problems of unbalance and vibration.

2. Description of Related Art

Various balancing systems have been employed for balancing rotating bodies. One type of balancing system for use with semi-truck wheels includes the placement of a granular powder inside large truck tires to provide balancing by inertial resistance to movement.

Another type of balancing system for a rotating member includes a fluid damper for internal combustion engine crankshafts. This system includes a crankshaft vibration damper consisting of a dense rubberized ring suspended in a closed ring filled with a viscous fluid. The damper is attached to the end of crank shaft to minimize shaft vibration cause by combustion and rotational unbalance. Various systems and methods for passive dynamic balancing of rotating members are shown, for example, in U.S. Pat. No. 1,776,125 to Linn; U.S. Pat. No. 2,659,243 to Darrieus; U.S. Pat. No. 2,771,240 to Nielsen; U.S. Pat. No. 5,593,281 to Tai and United States Patent Application Publication Number US 2010/0021303 to Nielsen et al.

In general, current practices for balancing rotors, such as those used in turbomachinery, include the steps of performing tests to determine a low speed balance, a high speed balance, or both, and then adding or removing mass in a fixed location by grinding, drilling, machining, by the addition of balance weights into a balance ring or threaded weight or resequencing of built up components such as blades and impellers.

These methods and systems can be time consuming and expensive, and can result in inconsistent results. Additionally, the system may become unbalanced over time or become unbalanced due to fouling, deposition, erosion or foreign object damage. Changes in system stiffness, such as but not limited to oil film stiffness, pedestal stiffness and foundation stiffness, between the balancing device and actual operational conditions of the machine may result in variation of the critical speed, amplitude and mode shape. These variations could require differing amount of mass correction at a polar location inconsistent with the balance correction performed by traditional methods of adding or removing mass which is described in detail above. Corrections to restore balance would typically require removal of the rotor from the operating machine and rebalancing in either a low or high speed bunker. Accordingly, there is a need for a consistent and inexpensive system and method for dynamically balancing a rotor which passively self corrects for unbalance while the rotor is in operation.

SUMMARY OF THE INVENTION

The present invention is directed to a dynamic balance system for a rotor which passively self corrects for unbalance while the rotor is in operation. The system includes a plurality of rings having an enclosed hollow chamber therein, fitted onto a rotor shaft in the location of predicted maximum shaft modal deflection, wherein each rings contains heavy metal ball bearings along with a viscous non-corrosive fluid.

According to a first aspect, the invention is directed to a passive dynamic inertial rotor balance system comprising a plurality of balancing members fitted onto a rotor shaft at locations of predicted maximum shaft modal deflection. Each of the balancing members includes at least one chamber. The chambers include a plurality of movable weights and a viscous fluid located therein, wherein as the shaft accelerates toward an unbalance point, the weights move within the chambers to a location which is opposite from the unbalance point due to inertial forces resisting the radial acceleration of the shaft in the direction of unbalance. The weights can comprise ball bearings formed from a heavy metal material, such as but not limited to a tungsten alloy. The viscous fluid can comprise a non-corrosive fluid material, such as a petroleum or glycol based substance. The balancing member can be a ring which defines a central open portion configured for placement about the rotor shaft and the at least one chamber can comprise an annular hollow portion extending about the central open portion and defined by walls of the ring. Up to one half of a circumference of the hollow portion of the ring can be covered by the ball bearings depending on a predicted unbalance response and the hollow portion can be fully filled with the viscous fluid. According to one design, the plurality of balancing members can be at least three balancing members wherein one balancing member is located near a center portion for a first mode bending and the other two balancing members are located at either side of the first balancing member at approximately quarter spans for a second mode bending.

According to another aspect, the invention is directed to a system for self-correcting an unbalance of a turbomachinery rotor during rotation of the rotor, wherein the system comprises at least three rings mounted at predetermined locations along a shaft of the rotor, each of the rings including an enclosed chamber. A plurality of movable weights is located within the chamber of each of the rings and a fluid is located within the chamber of each of the rings to surround the movable weights. Upon the presence of an unbalance during rotation, the weights located within the chambers move in a direction which is opposite from the location of the unbalance. According to one embodiment, the movable weights can comprise ball bearings and the fluid can comprise a viscous material capable of providing damping for the movable weights preventing excess movement thereof, and to provide these bearings with lubrication. The rings are located along the shaft of the rotor at locations of predicted maximum shaft modal deflection. According to one design, a first ring can be located near a center portion for a first mode bending, a second ring can be located to one side of the first ring, and a third ring can located to an opposite side of the first ring. The second and third rings can be located at approximately quarter spans for a second mode bending.

According to still another aspect, the invention is directed to a method for balancing a rotor, such as a rotor in turbomachinery. The method comprises providing a plurality of rings, wherein each of the rings including a hollow chamber, and wherein the hollow chamber contains movable weights and a viscous fluid material. The method further comprises positioning the rings along the shaft of the rotor, such that the rings are positioned at predetermined locations along a longitudinal length of the shaft at locations of predicted maximum shaft modal deflection. As the shaft radially accelerates toward an unbalance point, the weights move within the hollow rings in a direction that is opposite to the unbalance point, such as a location that is approximately 180° away from the unbalance point. According to one embodiment, at least one ring is positioned near the longitudinal center of the shaft for first mode bending and additional rings are located at locations for second mode bending. The weights can comprise ball bearings, such as those formed from a heavy metal material, and the fluid material can comprise a material, such as a non-corrosive viscous material, capable of providing damping for the bearings to prevent excess movement thereof and to provide lubrication for the ball bearings.

These and other features and characteristics of the present invention, as well as the methods of operation and functions of the related elements of structures and the combination of parts and economies of manufacture, will become more apparent upon consideration of the following description with reference to the accompanying drawings, all of which form a part of this specification, wherein like reference numerals designate corresponding parts in the various figures.

BRIEF DESCRIPTION OF THE DRAWING(S)

FIG. 3A shows a schematic cross-sectional view of the balance ring of the invention wherein the balance weights are at a balanced or resting position; and FIG. 3B shows a schematic cross-sectional view of the balance member of the invention wherein the balance weights are moving to counteract an unbalance point.

DESCRIPTION OF THE PREFERRED EMBODIMENT(S)

Figure 1:
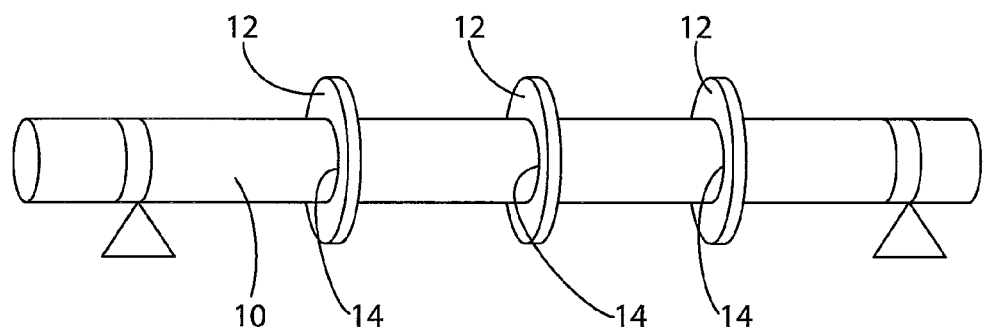
FIG. 1 shows a side perspective view of a shaft including the balance members of the invention.

For purposes of the description hereinafter, the terms "upper", "lower", "right", "left", "vertical", "horizontal", "top", "bottom", "lateral", "longitudinal" and derivatives thereof shall relate to the invention as it is oriented in the drawing figures. However, it is to be understood that the invention may assume various alternative variations, except where expressly specified to the contrary. It is also to be understood that the specific devices illustrated in the attached drawings, and described in the following specification, are simply exemplary embodiments of the invention. Hence, specific dimensions and other physical characteristics related to the embodiments disclosed herein are not to be considered as limiting.

Reference is now made to FIG. 1 which shows a side perspective view of a rotor shaft 10 including the balance members 12 of the invention. The balance members 12 can be in the form of rings which define a central open portion 14 configured for placement about the rotor shaft 10. It can be appreciated that these balance members 12 can be located on any type of rotating shaft for use in various types of machinery, including turbomachinery and the like. The balancing members 12 are fitted onto the rotor shaft 10 at locations of predicted maximum shaft modal deflection.

Figure 2A:
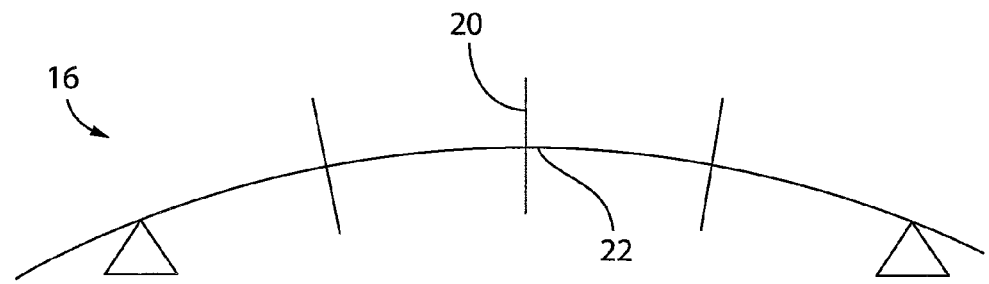
FIG. 2A shows a schematic rendering of a first critical bending mode maximum deflection of which the shaft would experience during an unbalance.
Figure 2B:
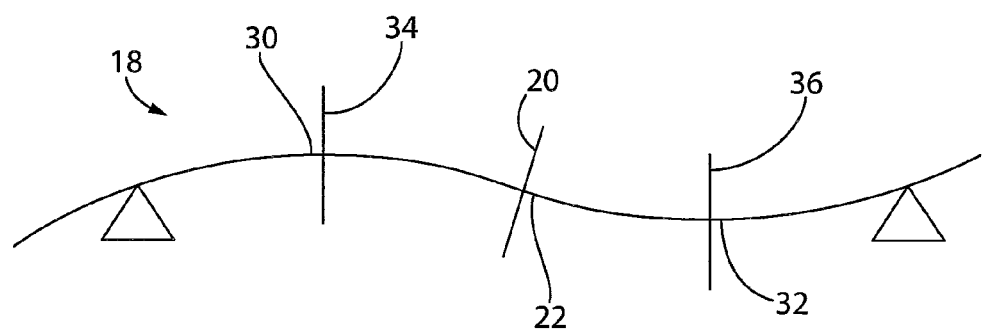
FIG. 2B shows a schematic rendering of a second critical bending mode maximum deflection of which the shaft would experience during an unbalance.
Figure 2C:
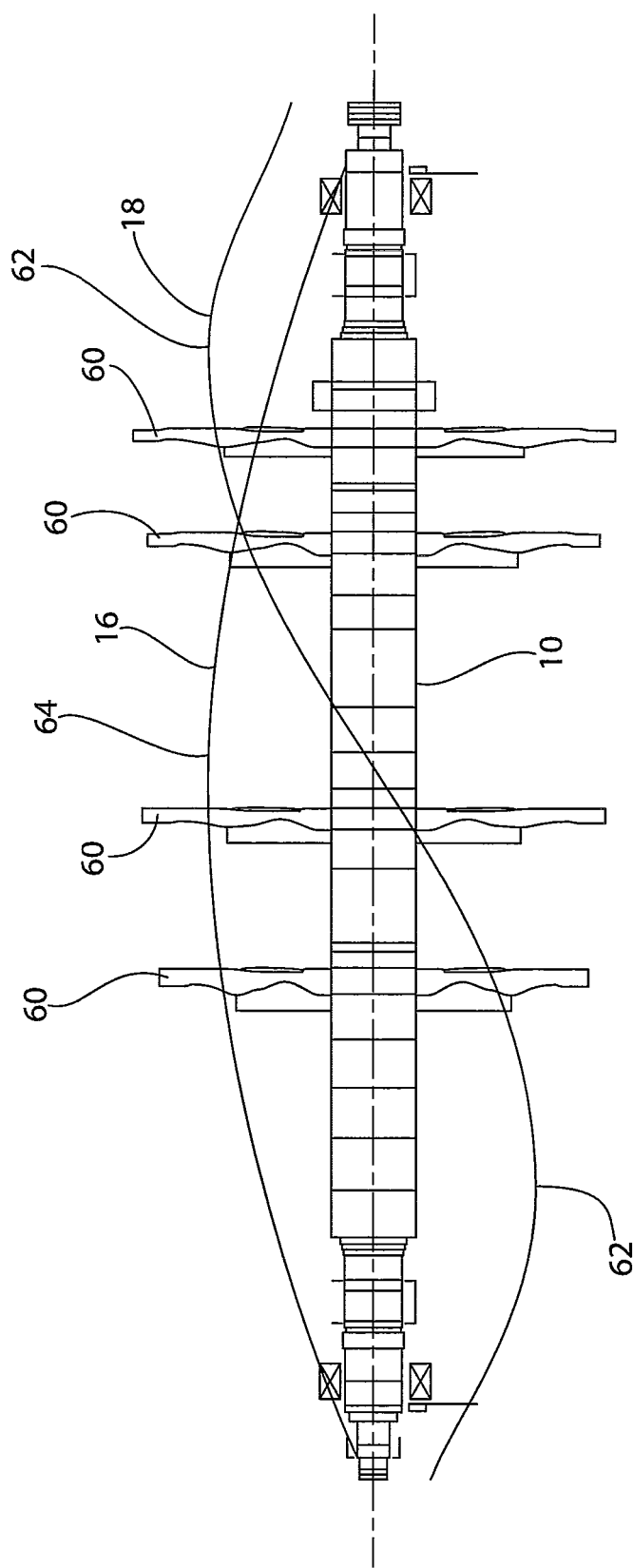
FIG. 2C shows a schematic side view of a rotor shaft and an example of predicted rotordynamic bending modes.

Referring now to FIG. 2A, there is shown a schematic rendering of a first critical bending mode maximum deflection, as generally indicated by 16, for which the shaft would experience during an unbalance. FIG. 2B shows a schematic rendering of second critical bending mode maximum deflection, as generally indicated by 18, for which the shaft would experience during an unbalance. FIG. 2C shows a schematic side view of the rotor shaft 10 and an example of predicted rotordynamic first critical bending mode 16 and the second critical bending mode 18 of FIGS. 2A and 2B, respectively. The balancing members 12 are positioned at locations of predicted maximum shaft modal deflection. For example, as shown in FIGS. 2A and 2B, the plurality of balancing members 12 can be at least three balancing members wherein a first balancing member 20 can be located near a center portion 22 at the location of maximum deflection for a first mode bending 16. The second mode bending 18 produces two locations of maximum deflection 30, 32 at opposite sides of the first mode bending location 22 at approximately quarter spans for a second mode bending 18. A second balancing member 34 and a third balancing member 36 can be located to either side of the first balancing member 20 at these points of maximum deflection 30, 32 for the second mode bending 18.

FIG. 2C represents a rotordynamic lateral analysis for a typical centrifugal compressor rotor comprised of a shaft 10 and four impellers 60. The lateral analysis predicts the mode shapes, crititcal speeds, and location of points of maximum deflection amplitude for each mode shape. The position of balancing devices 12 are to be located at points of predicted maximum deflection 64 for the first bending mode 16 and maximum deflection 62 of the second bending mode 18. It can be appreciated that any number of balancing members can be positioned along the longitudinal length of the rotor shaft 10, depending upon the length of the rotor shaft 10 and number of predicted bending modes.

Referring now to FIGS. 3A and 3B, there is shown a balancing member 12 wherein the balancing member 12 includes at least one chamber 40. The balancing member 12 can be a ring which defines a central open portion 14 configured for placement about the rotor shaft 10. The at least one chamber 40 can comprise an annular hollow portion extending about the central open portion 14 and defined by and inner wall 41a and an outer wall 41b of the ring. The chambers 40 include therein a plurality of movable weights 42 and a viscous fluid 44. During rotation, as shown by arrow 55 in FIG. 3B, and as the rotor shaft 10 accelerates toward an unbalance point 46, as depicted by arrow 48 in FIG. 3B, the weights 42 move within the chamber 40 in a direction, as depicted by arrows 50, toward a location 52 which is opposite from the unbalance point 46. This location can be approximately 180° away from the unbalance point 46. The weights 42 can comprise ball bearings formed from a heavy metal material, such as a tungsten alloy. The viscous fluid 44 can comprise a non-corrosive fluid material, such as a petroleum or glycol based substance. Up to one quarter of a circumference 54 of the annular hollow portion or chamber 40 of the balancing member of ring 12 can be covered by the ball bearings 42. The annular hollow portion or chamber 40 can be fully filled with the viscous fluid.

The present invention relies on Newton's laws and the basic laws of inertia. An unbalance of a rotor shaft causes a force accelerating radially outward in the direction of the unbalance. The inertia of the ball bearings causes them to want to stay at rest, so as the shaft accelerates toward the unbalance, the ball bearings move 180° away from the unbalance point (and acceleration vector) moving the center of mass coincident with the axis of rotation. The viscous fluid provides the dual function of damping for the bearings to prevent excessive movement of the bearings and to provide lubrication for the bearings as they move within the chamber of the balance member. By theory, the bearings will settle to a location that results in no net radial acceleration of the shaft and therefore no vibration. If the balance of the rotor shaft changes, such as by rotor dynamic bending, fouling and the like, the bearings passively dynamically adjust, returning the system to a state of zero acceleration and therefore no unbalance.

Referring back to FIGS. 2A and 2B, a method for balancing a rotor, such as a rotor in turbomachinery comprises determining the locations of predicted maximum shaft modal deflection according to a first critical bending mode 16 and a second critical bending mode 18. The method further includes providing a plurality of balance members 12, such as in the form of rings. As discussed above in relation to FIGS. 3A and 3B, each of the rings 12 includes a hollow chamber 40 and the hollow chamber 40 contains movable weights 42 and a viscous fluid 44 material. The method further comprises positioning the rings 12 along the shaft 10 of the rotor such that the rings 12 are positioned at predetermined locations along a longitudinal length of the shaft at locations of predicted maximum shaft modal deflection such that as the shaft accelerates toward an unbalance point 46, the weights move within the hollow rings 12 in a direction that is opposite to the unbalance point 46, such as a location 52 which is approximately 180° away from the unbalance point 46, as depicted by arrow 50. As discussed above, according to one embodiment, at least a first balancing member or ring 22 is positioned near the longitudinal center 22 of the shaft 10 for first mode bending and additional balancing members or rings, such as a second balancing member or ring 34 and a third balancing member or ring 36 are located at locations 30, 32 for second mode bending.

Referring again to FIGS. 3A and 3B, the movable weights 42 can comprise ball bearings, such as those formed from a heavy metal material, and the fluid material 44 can comprise a non-corrosive viscous material such as a petroleum or glycol based substance. This viscous material can be any known type of non-corrosive material which is capable of providing damping for the bearings to prevent excess movement thereof and to provide lubrication for the ball bearings.

Although the invention has been described in detail for the purpose of illustration based on what is currently considered to be the most practical and preferred embodiments, it is to be understood that such detail is solely for that purpose, and that the invention is not limited to the disclosed embodiments, but, on the contrary, is intended to cover modifications and equivalent arrangements that are within the spirit and scope of this description. For example, it is to be understood that the present invention contemplates that, to the extent possible, one or more features of any embodiment can be combined with one or more features of any other embodiment.

The invention claimed is:

1. A passive dynamic inertial rotor balance system comprising:
   at least three balancing members fitted onto a rotor shaft at locations of predicted maximum shaft modal deflection, each of said balancing members including at least one chamber, said at least one chamber of each of said balancing members including:
   a plurality of movable weights; and
   a viscous fluid located therein, wherein as the shaft accelerates toward an unbalance point, the weights move within the at least one chamber to a location which is opposite from the unbalance point,
   wherein at least one balancing member is located near a center portion for a first mode bending and at least two balancing members are located at approximately quarter spans for a second mode bending.

2. The system of claim 1, wherein the weights comprise ball bearings formed from a heavy metal material.

3. The system of claim 2, wherein the heavy metal material comprises a tungsten alloy.

4. The system of claim 1, wherein the viscous fluid comprises a non-corrosive fluid material.

5. The system of claim 4, wherein the viscous fluid comprises a petroleum or glycol based substance.

6. The system of claim 1, wherein the balancing member is a ring defining a central open portion configured for placement about the rotor shaft and the at least one chamber comprises an annular hollow portion extending about the central open portion and defined by walls of the ring.

7. The system of claim 6, wherein up to one half of a circumference of the hollow portion of the ring is covered by the ball bearings and the hollow portion is fully filled with the viscous fluid.

8. A system for self-correcting an unbalance of a turbomachinery rotor during rotation of said rotor, said system comprising:
   at least three rings mounted at predetermined locations along a shaft of the rotor, each of said rings including an enclosed chamber;
   a plurality of movable weights located within said chamber of each of said rings; and
   a fluid located within said chamber of each of said rings and surrounding said movable weights, wherein upon the presence of an unbalance during rotation, the weights located within the chambers move in a direction which is opposite from the location of the unbalance,
   wherein a first ring is located near a center portion for a first mode bending, a second ring is located to one side of said first ring, and a third ring is located to an opposite side of said first ring, said second and third rings being located at approximately quarter spans for a second mode bending.

9. The system of claim 8, wherein the movable weights comprise ball bearings and the fluid comprises a viscous material capable of providing damping for the movable weights to prevent excess movement and to provide lubrication.

10. The system of claim 8, wherein the rings are located along the shaft of the rotor at locations of predicted maximum shaft modal deflection.

11. A method for balancing a rotor in a turbomachinery, said method comprising:
   providing a plurality of rings, each of said rings including a hollow chamber, said hollow chamber containing movable weights and a viscous fluid material; and
   positioning said rings along a shaft of said rotor, said rings being positioned at predetermined locations along a longitudinal length of said shaft at locations of predicted maximum shaft modal deflection such that as the shaft accelerates toward an unbalance point, the weights move within the hollow rings in a direction that is opposite to the unbalance point,
   wherein at least one ring is positioned near the longitudinal center of the shaft for first mode bending and wherein additional rings are located at locations for second mode bending.

12. The method of claim 11, wherein the weights comprise ball bearings and the fluid material comprises a material capable of providing damping for the bearings to prevent excess movement thereof and to provide lubrication for the ball bearings.

13. The method of claim 12, wherein the ball bearings are formed from a heavy metal material and the fluid material comprises a non-corrosive viscous material.

14. The method of claim 11, wherein the movable weights move to a location which is approximately 180° away from the unbalance point.

* * * * *

UNITED STATES PATENT AND TRADEMARK OFFICE
CERTIFICATE OF CORRECTION

| | | |
|---|---|---|
| PATENT NO. | : 8,984,940 B2 | Page 1 of 1 |
| APPLICATION NO. | : 13/438922 | |
| DATED | : March 24, 2015 | |
| INVENTOR(S) | : Ronald John Josefczyk | |

It is certified that error appears in the above-identified patent and that said Letters Patent is hereby corrected as shown below:

Title Page, Column 1, Item (73) Assignee, Line 1, delete "Elliot" and insert -- Elliott --

Signed and Sealed this
Eleventh Day of August, 2015

Michelle K. Lee
*Director of the United States Patent and Trademark Office*